H. MEYER.
POULTRY ROOST.
APPLICATION FILED JAN. 22, 1917.

1,227,647.

Patented May 29, 1917.

Inventor,
Herman Meyer, by
G.C. Kennedy,
Attorney.

UNITED STATES PATENT OFFICE.

HERMAN MEYER, OF DENVER, IOWA.

POULTRY-ROOST.

1,227,647. Specification of Letters Patent. Patented May 29, 1917.

Application filed January 22, 1917. Serial No. 143,860.

*To all whom it may concern:*

Be it known that I, HERMAN MEYER, a citizen of the United States of America, and a resident of Denver, Bremer county, Iowa, have invented certain new and useful Improvements in Poultry-Roosts, of which the following is a specification.

My invention relates to improvements in poultry roosts, and the object of my improvement is to provide a roosting bar for fowls, which is provided with day hiding-places for vermin, and a movable cover for the hiding-places, adapted to be shifted in order to expose the vermin thereby concealed, and permit of their destruction.

This object I have accomplished by the means which are hereinafter described and claimed, and which are illustrated in the accompanying drawings, in which—

Figure 1:
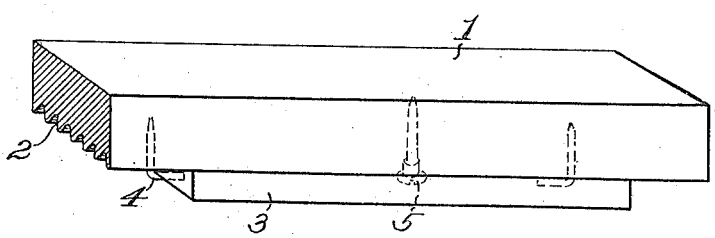
Figure 2:
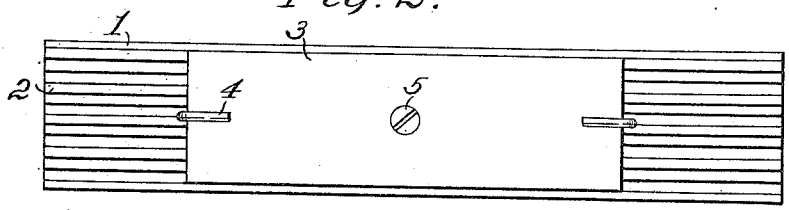
Figure 3:
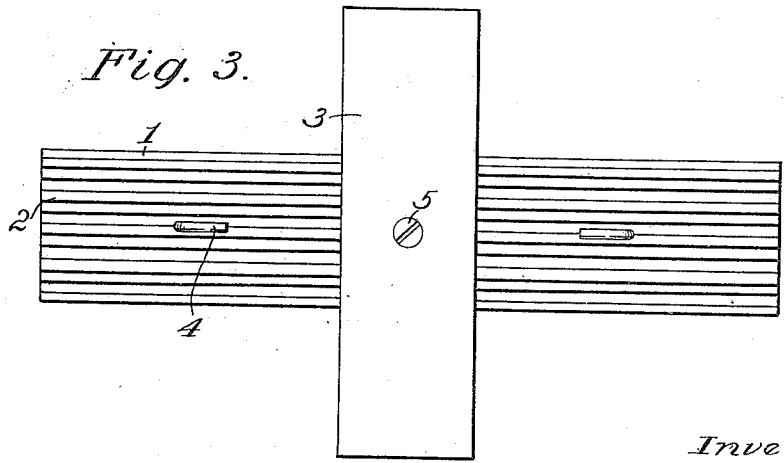

Figure 1 is a fragment of a poultry-roost bar, in perspective, and in the position as used; Fig. 2 is an under plan view thereof, with the swinging closure in its parallel covering relation to the longitudinal grooves in the bar, and Fig. 3 is a like view of said device, with the closure swung to a position at right angles to its position as shown in said Fig. 2.

Similar numerals of reference denote similar parts throughout the several views.

The bar 1, as shown in Fig. 1, is in the proper position for use as a roost for fowls. Its under surface is deeply striated or grooved to supply parallel longitudinal channels 2.

The numeral 3 denotes a swinging closure-plate medially pivotally connected to the under surface of the bar 1, by means of a screw 5 or other convenient and effective pivoting-means. When the plate 3 is alined with or in a position lying parallel to and upon the bar 1, as shown in Fig. 2, it covers all of the grooves 2 throughout its length. The numeral 4 denotes either of a pair of securing-clips, being nails or screws bent angularly to one side, and driven into the under side of the bar 1 to closely approximate the middle of each end of the plate 3 to overlap same, to hold the plate in place as against accidental displacements by the movements of fowls or otherwise, when the plate is closed into the position shown.

As is well known, mites or poultry vermin prey upon the fowls at night while upon the roost, and then conceal themselves during the day in dark or sheltered nooks in the vicinity. My improved roost has the grooves 2 provided in its under surface, and portions of the grooves covered at intervals by a plurality of the covering plates or closures 3, which thus inclose parts of the grooves so as to afford darkened and inclosed hiding-places for the vermin.

The bar 1 may be inverted, the swinging closures 3 swung around to the position shown in said Fig. 3, and scalding water or other efficacious means of destruction applied to the vermin congregated in the grooves thus uncovered.

The device is of cheap construction, and is easily operated, and very effectual for the purpose.

Having described my invention, what I claim as new, and desire to secure by Letters Patent, is:

A poultry roost, comprising an invertible bar, said bar being provided in its under surface with a plurality of longitudinal parallel grooves, a closure-plate medially pivoted to the under surface of the bar so as to cover the width thereof when closed and adapted to be rocked to uncover the grooves, and angularly-bent clips mounted on said bar at both ends of the closure-plate and having parts directed toward each other adapted to receive and frictionally hold removably the ends of said closure-plate when the latter is rocked into its closed position.

Signed at Waterloo, Iowa, this 6th day of Jan., 1917.

HERMAN MEYER.

Witnesses:
 GEO. C. KENNEDY,
 PEARL STANTON.